3,221,060
PROCESS FOR THE MANUFACTURE OF STORAGE-STABLE ALKYLATED BISPHENOL ELASTOMER ANTIOXIDANTS
Harry E. Albert and Paul G. Haines, Lafayette Hill, Pa., assignors to Pennsalt Chemicals Corporation, Philadelphia, Pa., a corporation of Pennsylvania
No Drawing. Filed Apr. 4, 1961, Ser. No. 100,497
6 Claims. (Cl. 260—619)

This invention relates to an improved process for the preparation of antioxidants for natural and synthetic rubber whereby said antioxidants are produced by reaction of aldehydes with tertiary alkyl xylenols to yield single phase liquid antioxidant products.

Excellent antioxidants for natural and synthetic rubber may be prepared in good yield by alkylating commercially available xylenol mixtures and then condensing the alkyl xylenols with aldehydes to obtain bisphenolic type products. However, in commercial practice it is found that the product obtained is an oil which, on standing during storage, has a tendency to partially crystallize to give a mixture of oil and solid crystals. Such a mixture is frequently unsatisfactory to the user and it is desirable from a practical standpoint that the antioxidant product be either entirely solid or entirely liquid.

It has now been found that those antioxidants obtained by reaction of tertiary alkylated xylenol mixtures with aldehydes can be obtained in a single phase liquid form and free of crystallization tendencies and this is accomplished according to this invention by using more than one aldehyde for the condensation.

In accordance with this invention liquid rubber antioxidants which are both nonstaining and of high antioxidant activity are provided from relatively inexpensive starting materials and by economic procedures. The antioxidants are prepared by first alkylating a xylenol with an alkylating agent, preferably an olefin, containing from 3 to 12 and preferably 4 to 9 carbon atoms. The crude alkylate is then reacted with a mixture of aldehydes to convert the alkylated xylenols to predominantly bis-type products. After the aldehyde condensation is completed, the water of condensation and other volatile products are removed by distillation and the liquid residue remaining is ready for storage or use as an antioxidant. The liquid product so obtained remains entirely liquid on storage and will not crystallize even on seeding.

The xylenols used as starting reagents for the process of this invention are the xylenols and their mixtures; e.g. 2,3-xylenol, 2,4-xylenol, 2,5-xylenol, and 2,6-xylenol.

The alkylating agent may be an olefin, an organic halide or an alcohol having from 3 to 12, and preferably from 4 to 9 carbon atoms. Olefins are the preferred alkylating agents since they are generally less expensive and more readily available, than the corresponding halides or alcohols. They are likewise preferred since they produce no side product during the alkylation as do the halides (which produce hydrogen halides) and the alcohols (which produce water).

Preferred among the olefins are the alkenes such as butenes, amylenes, hexenes, heptenes, octenes and nonenes. Such olefins are available as by-products of petroleum refinery operations such as from the catalytic cracking of gas oil; by the polymerization of propylene to produce isomeric hexenes or nonenes; by the polymerization of isobutylene to produce isomeric octenes and from other similar relatively inexpensive sources. Particularly preferred are tertiary alkenes (i.e. containing a tertiary carbon atom) having from 4 to 9 carbon atoms such as isobutylene, diisobutylene (which is a mixture of the isomers 2,4,4-trimethyl pentene-2 and 2,4,4-trimethyl pentene-1 produced by the dimerization of isobutylene) and the olefins 2-methyl butene-1, and 2-methyl butene-2. Commercial olefin mixtures, such as mixed amylenes, mixed hexenes, mixed heptenes, mixed octenes or mixed nonenes are desirable because of their relatively low cost. Other olefins that may be employed include cycloalkenes such as cyclohexene, α-methylcyclohexene, cyclopentene, α-methylcyclopentene, 4-methylcyclohexene, etc. and aralkenes such as styrene, α-methylstyrene, 4-methylstyrene, 4-ethylstyrene, 3-chlorostyrene, 2-methylstyrene, etc.

Among the organic halides that may be employed, the chlorides and bromides, and particularly the chlorides are preferred. Suitable organic halides include alkyl halides, such as tert-butyl chloride, tert-amyl chloride, mixed amyl chlorides, mixed hexyl chlorides, mixed octyl chlorides, mixed nonyl chlorides, mixed amyl bromides, etc. and particularly tertiary alkyl halides such as tert-butyl chloride, tert-amyl chloride, chlorides produced by reaction of HCl with diisobutylene using ionic catalysts, tert-butyl bromide, tert-amyl bromide, chlorides produced by reaction of HCl with mixed nonenes using ionic catalysts, etc. Also suitable are cycloalkyl halides such as cyclohexyl chloride, cyclohexyl bromide, α-methylcyclohexyl chloride, α-methylcyclohexyl bromide, cyclopentyl chloride, etc., and aralkyl halides such as α-chloroethylbenzene, α-chloroisopropylbenzene, p-(α-chloroethyl) toluene, m-(α-chloroethyl) toluene, benzyl chloride, benzyl bromide, p-methylbenzyl chloride, p-chlorobenzyl chloride, etc.

Alcohols that may be employed as alkylating agents include alkanols such as tert-butyl alcohol, sec-butyl alcohol, pentanol-2, hexanol-3, tert-amyl alcohol, octanol-2, octanol-4, nonanol-4, etc. and particularly tertiary alkanols such as tert-butyl alcohol, tert-amyl alcohol, 1,1-dimethylbutanol, 1,1-dimethylhexanol, 1,1,3,3-tetramethylbutanol. Also suitable are cycloalkanols such as cyclohexanol, α-methylcyclohexanol, cyclopentanol, α-methylcyclopentanol, 4-methylcyclohexanol, 3-methylcyclohexanol, 2-methylcyclohexanol and aralkanols such as α-methylbenzyl alcohol, benzyl alcohol, p-methylbenzyl alcohol, m-methylbenzyl alcohol, o-methylbenzyl alcohol, β-phenylethyl alcohol, etc.

Using the preferred olefin alkylating agents, the alkylation is carried out in the presence of Friedel-Crafts type catalysts, e.g. sulfuric acid, hydrochloric acid, $AlCl_3$, $ZnCl_2$, $SnCl_4$, $H_3PO_4$, $BF_3$, etc.; anhydrous reaction media; temperatures ranging from 20 to 120° C. and preferably from 20 to 80° C.; pressures ranging from atmospheric to 1000 lbs./in.² gage or more and preferably from atmospheric to 60 lbs./in.² gage; and reaction periods of from 1 to 8 hours. The molar ratio of olefin to xylenol should generally be in the range of from 3 to 1 to 1 to 1 depending upon the potentially available alkylatable positions on the nucleus of the xylenol material.

When using an organic halide as the alkylating agent, similar alkylating conditions are employed, including the same Friedel-Crafts type catalysts.

Employing alcohols and alcohol as the alkylating agent, preferred reaction conditions are essentially the same except that generally more vigorous conditions are necessary due to the lesser reactivity of alcohols as alkylating agents.

The composition of the crude alkylate will depend upon the particular xylenol starting material employed. In all cases some of the original phenolic material will remain unalkylated because of the difficulty involved in carrying the alkylation to 100% completion. At least one and in many cases two of the reactive ortho and para positions is either blocked or hindered. In the case of 2,5-xylenol for example it is difficult to obtain substantial alkylation at any of the positions and as a consequence a high proportion of this isomer usually remains unalkylated. The alkylation of 3,5-xylenol is even more difficult. Generally in the case of the commercial xylenol mixtures from 40% to 60% of the xylenol will remain unalkylated.

Aldehydes suitable for use as mixtures in the condensation reaction following the alkylation include aldehydes having from 1 to 9 carbon atoms and preferably from 2 to 5 carbon atoms, aliphatic aldehydes containing only carbon, hydrogen and oxygen being preferred. Particular preferred aldehydes include glyoxal, acetaldehyde (or paraldehyde), propionaldehyde, n-butyraldehyde, isobutyraldehyde, n-valeraldehyde and isovaleraldehyde. Other aldehydes that may be employed include, e.g. formaldehyde, benzaldehyde, p-chlorobenzaldehyde, salicylaldehyde, chloroacetaldehyde, chloral, β-chloropropionaldehyde, crotonaldehyde, acrolein, glutaraldehyde, 2-ethylhexaldehyde, and aldol.

Of these aldehydes two or more may be employed to obtain the benefits of this invention. Mixtures of isobutyraldehyde and formaldehyde, isobutyraldehyde and acetaldehyde (or paraldehyde), proporionaldehyde and benzaldehyde, chloroacetaldehyde and formaldehyde, n-butyraldehyde and n-valeraldehyde, illustrate specific useful aldehyde mixtures. Also operable in the invention is the use of a mixture of aldehyde isomers; e.g. n-butyraldehyde and isobutyraldehyde, n-valeraldehyde and isovaleraldehyde, and the like. The amounts of each aldehyde in the mixture may vary over a wide range, but the aldehyde mixture will contain at least about 5 mole percent of any aldehyde component in order to ensure that the product remains a single liquid phase material. Generally, the preferred amount of aldehyde component having the lower concentration will be between about 10 and 50 mole percent of the mixture. Expressed another way the mole ratio of aldehydes in a two-component mixture will be between about 5:95 and 95:5, preferably 10:90 to 50:50.

The condensation with the aldehyde is carried out by adding the aldehydes together with a condensation catalyst to the crude alkylate without separating the unalkylated from the alkylated material. It will be understood that the aldehydes may be added as a mixture or alternately in an equivalent manner by adding one and then the other. The condensation conditions should be adjusted such that the predominant products of the condensation are bis alkylated xylenols with only minor amounts, e.g. 2 to 5%, of higher condensation products such as tris and tetrakis products, and such that essentially no resinous material is produced, that is, molecules containing more than about 4 xylenol nuclei. When a polyfunctional aldehyde is used as gloxal, one of two moles of xylenol material may condense with each aldehyde group such that e.g. two or four moles of xylenol may condense with one mole of gloxal depending upon the particular xylenol isomer. With reference to such polyfunctional aldehydes, the term bis xylenol is intended to mean condensates containing per molecule no more than two xylenol nuclei for each aldehyde group of the aldehyde. For example, a bis-xylenol with reference to glyoxal would mean one containing four xylenol nuclei per molecule. However, since alkylated xylenols are used in this process having at least three out of its five possible positions blocked by alkyl groups there is little tendency to form resinous higher condensates and accordingly an excess of aldehyde may be used without the formation of resinous products. Some excess of total aldehyde over the theoretical (i.e. stoichiometric) amount to form bisxylenols is often desirable to assure complete conversion of condensable xylenols particularly since some of the aldehydes may be consumed by side reactions such as by self-condensation.

Reaction temperature for the condensation reaction will usually be between 20° C. and 100° C. Lower temperatures, e.g. 20° C. to 40° C. are favored for aldehyde mixtures containing formaldehyde because of the reactivity of this aldehyde, while with less reactive aldehydes mixtures such as propionaldehyde and isobutyraldehyde, reaction temperatures of from 40° C. to 80° C. are generally preferred.

The condensation reaction is preferably carried out in the presence of an acidic type catalyst such as the acidic type catalyst already present from the alkylation step or may be an acid added at the time of the aldehyde reaction step. Sulfuric, phosphoric or acetic acids are to be preferred.

It is preferred in most cases to carry out the condensation reaction in the presence of the same catalyst that has served as the alkylation catalyst in the previous alkylation reaction. Following this procedure, to effect the condensation, it is merely necessary to add the aldehyde mixture to the crude alkylate and, if required, additional catalyst of the same type as employed in the alkylation. It is generally unnecessary prior to the condensation reaction, to remove excess olefin present in the crude alkylate from the alkylation reaction since this can be stripped off, together with other volatiles, following the condensation.

Reaction time is not critical, and usually is of the order of from 1 to 5 hours.

A mole of water is released during the condensation reaction for each mole of aldehyde that reacts, and following the reaction, the reaction product may be separated into an aqueous and an organic layer. In most cases, however, the amount of water is small relative to the amount of organic material. In this event no separation is necessary and the water is conveniently stripped off as distillate along with the volatile organic material, such as unreacted aldehyde and olefin. The product is treated to neutralize the residual catalyst using for example sodium carbonate. The neutralized product is then steam distilled to strip off volatiles such as unreacted olefin, unreacted xylenols, and unreacted aldehyde and after application of a vacuum to remove any residual water present it is then filtered to remove insolubles, principally inorganic salts.

In order to further describe the invention the following examples are given:

EXAMPLE 1

To 976 g. (8.0 moles) of a commercial mixture of xylenols and 49 g. conc. sulfuric acid, 941 g. (8.4 moles) of diisobutylene was gradually added as the mixture was stirred for 2 hours at 35–50° C. The commercial mixture of xylenol is a commercial tar acid fraction containing 34.0% 2,3-xylenol, 34.5% 2,4-xylenol, 25.5% 2,5-xylenol and 6.0% 3-ethylphenol. The diisobutylene is a commercial product obtained by dimerization of isobutlyene and contains approximately 75% 2,4,4,-trimethylpentene-1, 23% 2,4,4-trimethylpentene-2 with about 2% of other octene isomers. A mixture of 346 g. (4.8 moles) of isobutyraldehyde and 70 g. (1.6 moles) of paraldehyde was added and reacted for 1 hour at 30–50° C. followed by 70 g. (1.6 moles) more of paraldehyde reacted likewise for 1 hour at 30–50° C. After addition of 28 g. sodium carbonate to neutralize the catalyst the crude product was stripped of volatile material by blowing steam through the mixture at 140–150° C. At the end of the steam stripping, slightly reduced pressure was applied to remove any water. After removal of inorganic salts by filtration there was 1953 g. of viscous oil product.

EXAMPLE 2

As in Example 1 the same alkylate mixture was prepared from 976 g. xylenols, 49 g. conc. sulfuric acid and 941 g. of diisobutylene. A mixture of 346 g. (4.8 moles) isobutyraldehyde and 230 g. (3.2 moles) of n-butyraldehyde was added and stirred for 2 hours at 35–50° C. After neutralization with 28 g. sodium carbonate the crude was treated as in Example 1. The product, a viscous oil, weighed 1825 g.

EXAMPLE 3-A

To 732 g. (6.0 moles) of the commercial xylenol mixture of Example 1 and 32 g. conc. sulfuric acid, 672 g. (6.0 moles) diisobutylene was added dropwise at 65° C. after which the mixture was stirred at 55–65° C. for 2.5 hours. After addition of 10 ml. of water to dilute the catalyst, 281 g. (3.9 moles) of isobutyraldehyde was added and the mixture was stirred at 55–65° C. for 2 hours. At this point 9.6 g. (0.32 mole) of paraformaldehyde was added and stirring at 55–65° C. was continued for another hour. After neutralization with sodium carbonate the crude was treated as in the previous examples. The product, a viscous oil, weighed 1346 g.

EXAMPLE 3-B

The above example was repeated except that no paraformaldehyde was used, the mole ratio of isobutyraldehyde to alkylated xylenols being about 0.65:1. The viscous oil product weighed 1362 g. Within two weeks on standing at room temperature approximately one-third of it crystallized. Likewise with examples where the mole ratio of isobutyraldehyde to alkylated xylenol varied from 0.2:1 to 1:1 the product showed partial crystallization on standing at room temperature.

EXAMPLE 4

Example 3-A was repeated except that the amount of paraformaldehyde was 19.6 g. (0.65 mole). The product, a viscous oil, weighed 1165 g.

EXAMPLE 5

Example 3-A was repeated except that the amount of paraformaldehyde was 36 g. (1.2 moles). The product, a viscous oil, weighed 1275 g.

EXAMPLE 6

Samples of the liquid products of Examples 1, 2, 3-A, 4 and 5 were seeded with crystals from Example 3-B. The seeded samples were alternated approximately every 18 to 24 hours at refrigerator temperature (5° C.) and at room temperature (22° C.) for a month. The products did not crystallize, but remained viscous oils.

Larger batches of the products of Examples 2, 3-A, 4 and 5 were prepared and held at room temperature for 13 months without crystallization.

The antioxidants prepared according to the above examples were evaluated by the following tests:

I. Antioxidant evaluation in vulcanized rubber

One part per hundred of rubber of each antioxidant to be evaluated was added to the following rubber compounds:

|  | Composition A | Composition B |
|---|---|---|
| Smoked sheet blend | 100 |  |
| Pale crepe |  | 100 |
| Calcene TM (CaCO₃ pigment) | 75 |  |
| Atomite whiting (CaCO₃ pigment) |  | 50 |
| Titanium dioxide |  | 20 |
| Zinc oxide | 10 | 10 |
| Stearic acid | 2 | 2 |
| Spider sulfur | 3 | 3 |
| DPG (diphenylguanidine) | 1.5 |  |
| MBTS (2-benzothiazolyl disulfide) |  | 1 |
|  | 191.5 | 186 |
| Cure: 15, 30, 60 min. at | 280° F. | 298° F. |
| Oxygen bomb aged at 70° C. for | 4 days | 7 days. |

Tensile strength was determined before and after bomb aging. An antioxidant index was determined by adding together the values for the percent tensile strength retained for the three cures in each series (i.e. Composition A+Composition B). This index gives an indication of the antioxidant activity of the product tested. The higher the antioxidant index that a product has, the higher is its antioxidant activity.

II. Discoloration tests

Strips of the B series vulcanizate were exposed for 48 hours to a sunlamp at a distance of 10 inches and to outdoor sunlight for two weeks. The test strips were rated on a scale of −1 to 4 where −1 represents slight bleaching, zero represents no change and 1, 2, 3, 4 represent increasing discoloration.

The following Table I indicates the results of the test procedures:

TABLE I

|  | Antioxidant index | | | Discoloration | |
|---|---|---|---|---|---|
|  | Composition A | Composition B | Total | Outdoor | Sunlamp |
| Product of Example 1 | 130 | 180 | 310 | −1 | 2 |
| Control without antioxidant | 0 | 96 | 96 | 0 | 1 |
| Commercial phenolic type antioxidant * | 91 | 199 | 290 | 0 | 2 |
| Product of Example 2 | 134 | 206 | 340 | 2 | 2 |
| Control without antioxidant | 0 | 130 | 130 | 1 | 1 |
| Commercial phenolic type antioxidant * | 86 | 178 | 264 | 3 | 2 |
| Product of Example 3 | 137 | 206 | 343 | −1 | 1 |
| Product of Example 4 | 151 | 190 | 341 | −1 | 2 |
| Control without antioxidant | 0 | 96 | 96 | 0 | 1 |
| Commercial phenolic type antioxidant * | 91 | 199 | 290 | 0 | 2 |
| Product of Example 5 | 156 | 196 | 352 | −1 | 1 |
| Control without antioxidant | 0 | 78 | 78 | 0 | 1 |
| Commercial phenolic type antioxidant * | 82 | 197 | 279 | 0 | 2 |

*A mixture of styrenated phenols.

III. Stabilizer evaluation on SBR polymer

Samples were prepared for evaluation by addition of the stabilizer material as a soap emulsion at a concentration of 1.25 parts per hundred of polymer. After addition of the soap emulsion containing stabilizer material to an SBR 1502 latex, the latex was coagulated by dropwise addition to a rapidly stirring dilute sulfuric acid-sodium chloride solution. The coagulated polymer crumb was washed with deionized water and then dried at 65° C. for eight hours in a forced air oven. Small samples of dry polymer in aluminum foil cups were oven aged at 100° C. in a gravity air circulation oven and observed at 24, 48, 72 and 96 hours. The samples were evaluated at the end of the time on the basis of surface softness, whether fused or not, color, and approximate state of cure. A rating scale of 0 to 3 is used in which zero represents no activity and 3 represent highest activity.

SBR polymer stabilizer activity
Product of Example 1 _____ 1
Product of Example 2 _____ 2
Product of Example 3-A _____ 2
Product of Example 4 _____ 2
Product of Example 5 _____ 2
Control, commercial SBR polymer stabilizer (styrenated phenol mixture) _____ 2
Control, no stabilizer _____ 0

It is clear from the above data that the antioxidants obtained by the novel process of this invention have excellent performance properties and the invention represents a distinct advance in the art.

It will be understood that many changes may be made from the above examples and description without departing from the spirit and scope of the invention.

We claim:

1. The process of preparaing a liquid mixture of alkylated bisxylenols stable to storage without formation of crystalline bodies by condensing at a temperature between 20° C. and 100° C. and under acidic conditions, at least a stoichiometric amount of a mixture of aldehydes selected from the group consisting of aliphatic aldehydes of from one to nine carbon atoms containing only carbon, hydrogen and oxygen, benzaldehyde, p-chlorobenzaldehyde, salicylaldehyde, chloroacetaldehyde, chloral, β-chloropropionaldehyde and aldol with a xylenol previously alkylated with an alkylating agent selected from the group consisting of olefins, organic halides and alcohols containing from 3 to 12 carbon atoms, each of said aldehyde in said mixture being present in an amount of at least about 5 mole percent.

2. The process of preparing a liquid mixture of alkylated bisxylenols stable to storage without formation of crystalline bodies by condensing a xylenol alkylated with an olefin containing 4 to 9 carbon atoms with at least a stoichimoetric amount of a mixture of aliphatic saturated aldehydes, said aldehydes containing 1 to 9 carbon atoms and containing only carbon, hydrogen and oxygen and each of said aldehydes in said aldehyde mixture being present in an amount of at least about 5 mole percent, said condensation being carried out under acidic conditions at a temperature between 20° C. and 100° C.

3. The process of claim 2 wherein the mixture of aldehydes consists essentially of isobutyraldehyde and acetaldehyde.

4. The process of claim 2 wherein the mixture of aldehydes consists essentially of n-butyraldehyde and isobutyraldehyde.

5. The process of condensing under acidic conditions at a temperature between 20° C. and 100° C. a mixture of xylenols previously alkylated with diisobutylene with a mixture consisting of about 40 mole percent of paraldehyde and about 60 mole percent of isobutyraldehyde, and separating a liquid rubber antioxidant product which is stable to storage without formation of crystalline bodies.

6. The process of condensing under acid conditions and at a temperature between 20 and 100° C. a mixture consisting of an essentially equimolar amount of n-butyraldehyde and isobutyraldehyde with a mixture of xylenols previously alkylated with diisobutylene, separating a rubber antioxidant product which is stable to storage without formation of crystalline bodies.

References Cited by the Examiner
UNITED STATES PATENTS

| | | | |
|---|---|---|---|
| 2,058,797 | 10/1936 | Honel. | |
| 2,398,069 | 4/1946 | Young | 260—619 X |
| 2,499,361 | 3/1950 | De Groote et al. | 260—619 X |
| 2,559,932 | 7/1951 | Briggs et al. | 260—619 X |

LEON, ZITVER, *Primary Examiner.*

CHARLES B. PARKER, HAROLD G. MOORE,
*Examiners.*